(12) United States Patent
Jean et al.

(10) Patent No.: US 7,896,576 B2
(45) Date of Patent: *Mar. 1, 2011

(54) ENHANCED WAVE POWER GENERATORS

(75) Inventors: Philippe F. Jean, Nice (FR); Guillaume A. Ardoise, Nice (FR); Jack Pollack, Houston, TX (US)

(73) Assignee: Single Buoy Moorings, Inc. (CH)

( * ) Notice: Subject to any disclaimer, the term of this patent is extended or adjusted under 35 U.S.C. 154(b) by 71 days.

This patent is subject to a terminal disclaimer.

(21) Appl. No.: 12/378,380

(22) Filed: Feb. 13, 2009

(65) Prior Publication Data

US 2009/0202303 A1   Aug. 13, 2009

Related U.S. Application Data

(63) Continuation-in-part of application No. 12/036,026, filed on Feb. 22, 2008, now Pat. No. 7,632,041.

(60) Provisional application No. 60/994,773, filed on Sep. 21, 2007, provisional application No. 60/926,177, filed on Apr. 25, 2007.

(51) Int. Cl.
    *E02B 9/08* (2006.01)

(52) U.S. Cl. ............................. 405/76; 290/53

(58) Field of Classification Search .............. 405/75, 405/76; 290/42, 53; 60/497, 498, 501, 502, 60/503, 504, 507
See application file for complete search history.

(56) References Cited

U.S. PATENT DOCUMENTS

| | | | | |
|---|---|---|---|---|
| 1,502,511 | A * | 7/1924 | Marvin | 60/501 |
| 2,783,022 | A * | 2/1957 | Salzer | 405/76 |
| 4,073,142 | A * | 2/1978 | Tornabene | 60/502 |
| 4,204,406 | A * | 5/1980 | Hopfe | 405/76 |
| 4,355,511 | A * | 10/1982 | Jones | 290/42 |
| 4,447,740 | A * | 5/1984 | Heck | 290/53 |
| 4,462,211 | A * | 7/1984 | Linderfelt | 60/501 |
| 4,631,921 | A * | 12/1986 | Linderfelt | 60/501 |
| 4,754,157 | A * | 6/1988 | Windle | 290/53 |
| 5,359,229 | A * | 10/1994 | Youngblood | 290/53 |
| 5,842,838 | A * | 12/1998 | Berg | 290/53 |
| 6,392,314 | B1 * | 5/2002 | Dick | 290/53 |
| 7,140,180 | B2 * | 11/2006 | Gerber et al. | 60/502 |
| 7,164,212 | B2 * | 1/2007 | Leijon et al. | 290/42 |
| 7,355,293 | B2 * | 4/2008 | Bernhoff et al. | 290/42 |
| 7,385,301 | B2 * | 6/2008 | Hirsch | 290/42 |
| 7,443,046 | B2 * | 10/2008 | Stewart et al. | 290/53 |
| 7,459,802 | B2 * | 12/2008 | Loui et al. | 290/53 |
| 7,557,456 | B2 * | 7/2009 | Kornbluh et al. | 290/42 |
| 7,632,041 | B2 * | 12/2009 | Jean et al. | 405/76 |
| 2005/0123353 | A1 * | 6/2005 | Dick | 405/76 |
| 2008/0197631 | A1 * | 8/2008 | Medina et al. | 290/42 |

* cited by examiner

*Primary Examiner* — Frederick L Lagman
(74) *Attorney, Agent, or Firm* — Leon D. Rosen

(57) ABSTRACT

Systems are disclosed for generating electricity from sea waves, that include a float (12) that lies at the sea surface (14) and moves up and down with the waves. A motion resist element (30) moves horizontally with the float but resists vertical movement. Electricity-generating apparatus (52, 54) is coupled to the float and resist element for generating electricity as the float moves vertically relative to the resist element.

5 Claims, 2 Drawing Sheets

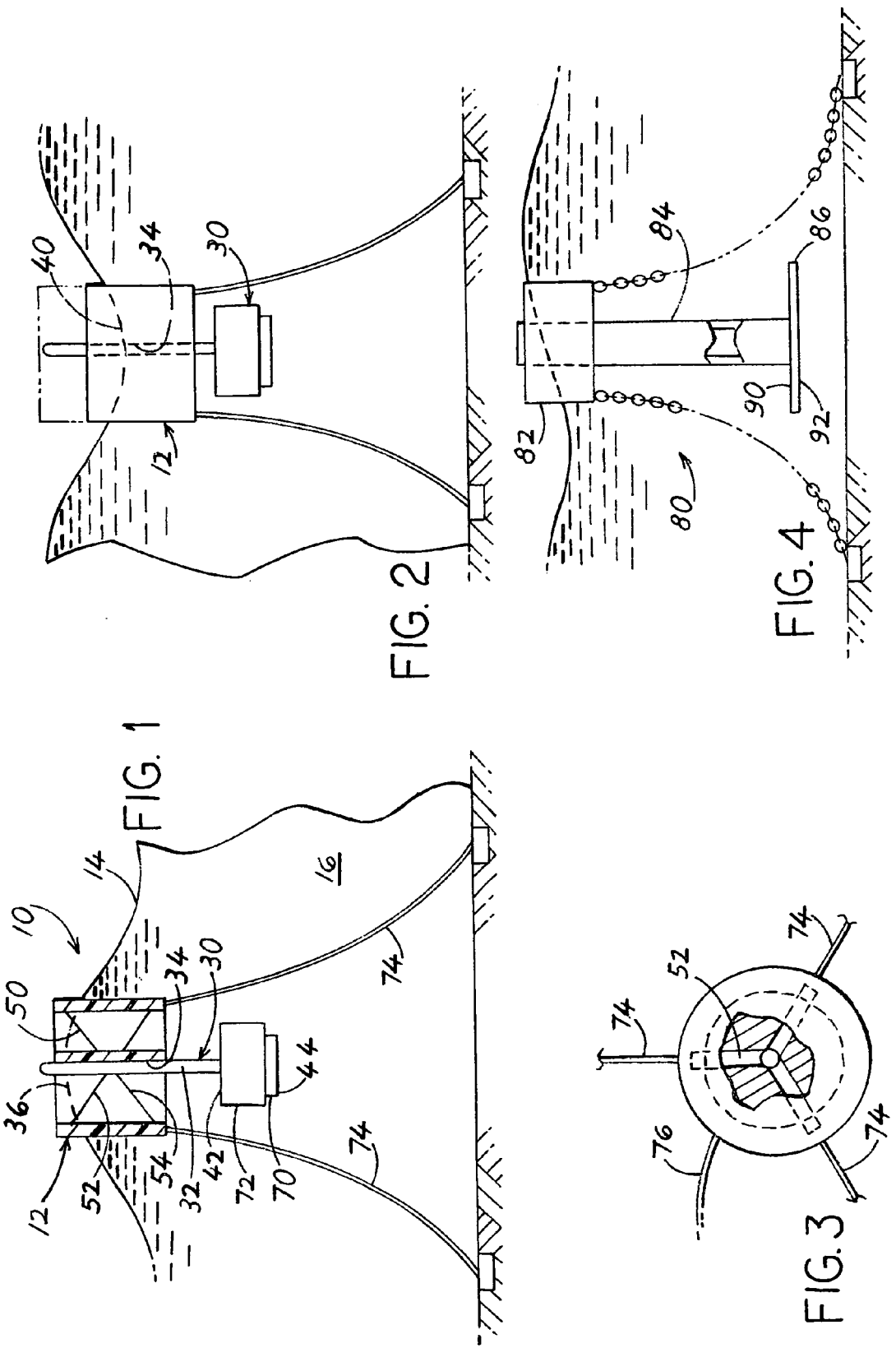

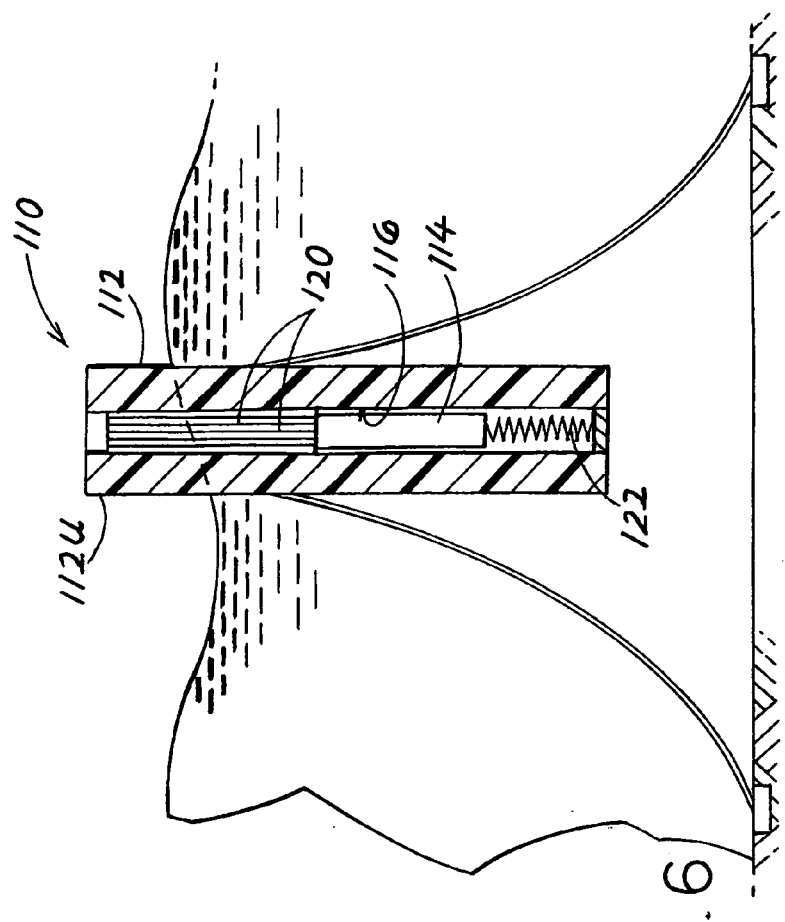
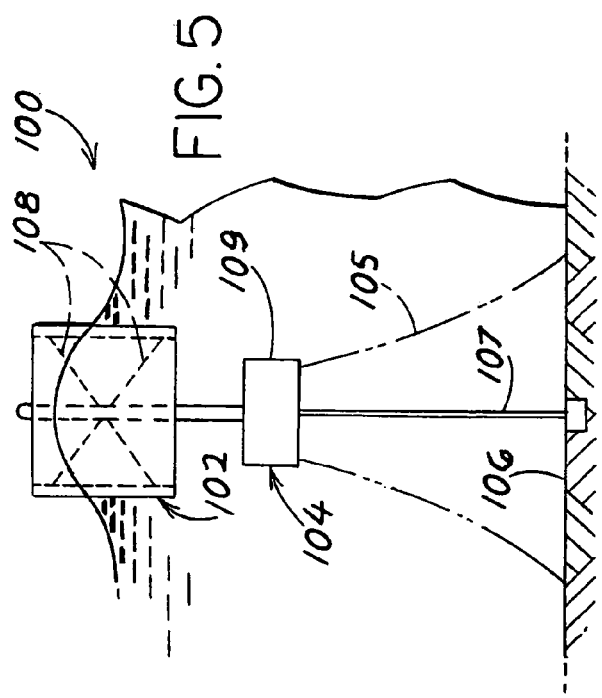

ENHANCED WAVE POWER GENERATORS

CROSS-REFERENCE

This is a continuation-in-part of U.S. patent application Ser. No. 12/036,026 filed 22 Feb. 2008, now U.S. Pat. No. 7,632,041, which claimed priority from provisional patent applications Ser. No. 60/994,773 filed 21 Sep. 2007 and Ser. No. 60/926,177 filed 25 Apr. 2007.

BACKGROUND OF THE INVENTION

Wave energy is greatest at the sea surface where the sea moves up and down as sea waves pass over a sea location. Systems can be constructed that generate electricity from the change in pressure at an undersea location as a wave passes over that location, or that generate electricity from the differences in pressure under a wave crest under a wave trough. A simple apparatus that generated electricity directly from the passage of sea waves would be of value.

SUMMARY OF THE INVENTION

In accordance with the present invention, systems are disclosed for generating electricity from the sea, which include a float that floats at the sea surface to move up and down with the waves. Each system also includes a resist element that is coupled to the float to move horizontally with the float, but to resist vertical movement with the float as the float moves up and down on the waves. An electricity-generating apparatus such as SSM (synthetic stretchable material), e.g. EPA (electro active polymer), is coupled to the float and to the resist element, to generate electricity as the float moves relative to the resist element.

In one set of electricity-generating systems, the resist element is an element of considerable mass and is not highly buoyant so it resists vertical movement, while the float is of minimum mass so it readily moves up and down in the waves. Thus, when the float moves rapidly upward in the crest of a wave, the resist element does not move upward rapidly. This results in the SSM material that connects the float and resist element, being stretched and thereby generating electricity. The resist element has at least a portion that relatively slides up and down in a vertical passage of the float. Drifting of the float from a quiescent position is avoided by mooring the float to the sea floor though catenary chains that allow the float to move up and down.

In another system, the resist element is connected to a mooring line that fixes the vertical position of the resist element and severely limits its drift, and the float moves up and down relative to the resist element. In another system, the resist element has a large area exposed to the sea at a large depth, so water resistance prevents rapid resist element vertical movement.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectional side view of a system for generating electricity of one embodiment of the invention, with the float shown in the crest of a wave, and with the float loosely moored to the sea floor FIG. 2 is a side elevation view of the system of FIG. 1 with the float shown in the trough of a wave.

FIG. 3 is a partial sectional top view of the system of FIG. 1.

FIG. 4 is a side view of a system for generating electricity of another embodiment of the invention, wherein the resist element is constructed for high resistance to vertical movement in water to resist its movement in the sea.

FIG. 5 is a side view of a system of another embodiment of the invention wherein the resist element is moored to the sea floor, instead of the float being moored.

FIG. 6 is a sectional side view of a system of the invention showing another arrangement that uses SSM materials to generate electricity.

DESCRIPTION OF THE PREFERRED EMBODIMENTS

FIG. 1 shows a system 10 which includes a highly buoyant float 12 that floats at the surface 14 of a sea 16. A motion resist element 30 that is preferably neutrally buoyant, has a slider portion 32 that slides up and down within a vertical passage 34 of the float. When the crest 36 of a wave passes across the float, the float moves up to the high position shown in FIG. 1. When the trough 40 of a wave passes the float, as shown in FIG. 2, the float moves down to the low position shown in FIG. 2.

The resist element 30 resists vertical movement because it has considerable weight and therefore momentum, and because there is little friction between the walls of the float passage 34 and the slider portion 32 of the resist element. Also, the resist element has large upper and lower areas 42, 44 that are exposed to the water of the sea and encounter resistance from movement in the water, although water close to the sea surface (e. g. within about 10 meters below the sea surface) tends to move up and down though not as much as the waves on the surface.

SSM material (synthetic stretchable material), preferably EPA (electro active polymer) 50 which generates electricity when stretched while an electric field is established between its opposite sides, extends between locations on the float 12 and on the resist element 30. Some of the material at 52 is stretched when the float moves up in a wave crest (but the resist element does not move up as much), and other material 54 is stretched when the float moves down in a wave trough (but the resist element does not move down as much).

Applicant constructs the resist element 30 so it is approximately neutrally buoyant. This facilitates the stretchable SSM material at 52 and 54 acting as a spring to urge the resist element towards a neutral position in the absence of waves. In FIG. 1 this is accomplished by constructing the resist element with a heavy part 70 such as a thick plate of steel, which is connected to the heavy slider portion 32, to provide considerable mass to resist rapid acceleration. In addition, a buoy or other biasing device 72 is attached to the resist element to counter the weight in water of the heavy part 70 and slider portion 32 so the resist element is largely neutrally buoyant in water. The float 12 is loosely held against drifting far from a center position (which it drifts towards in a quiescent sea), by catenary mooring lines 74 (preferably chains) that extend to and along the sea floor. The catenary lines add little resistance to vertical movement of the float, and they extend in different compass directions as seen in FIG. 3. FIG. 3 shows three catenary lines 74 and also shows an electricity cable 76 that carries away electricity.

The float 12 preferably is almost totally immersed in the sea, so it experiences almost maximum upward and downward forces as the crests and troughs of waves pass over it. A small portion of the float should project above the sea so the float always remains at the sea surface, even as it picks up and lays down mooring lines 74. Applicant prefers that at least 70% and more preferably at least 80% of the float volume remain immersed in the sea.

FIG. 4 shows another system 80 that includes a float 82 that floats in the waves and a motion resist element 84 that resists vertical movement with the float. In FIG. 4, most of the resistance to vertical movement of the resist element comes from a large water brake 86 at the lower end of the element. The water brake 86 lies deep under water, such as over 10 meters under the average sea surface height, so the brake is primarily isolated from up and down movement of the water under the waves. The diameter of the brake 86 is preferably more than half the diameter of the float, and its upper and lower area 90, 92 are preferably more than half the cross-sectional area of the float.

FIG. 5 shows another system 100 comprising a float 102 and resist element 104, wherein the resist element 104 is moored to the sea floor 106 by a line 107 extending down to the sea floor, and the resist element is positively buoyant. As a result, the resist element is held against horizontal drift and against vertical movement. There is a possibility of limited downward movement of the resist element if it is pulled down by SSM material attached to the float 102. The buoyancy of the resist element is sufficient so when the float moves down and the SSM material 108 urges the resist element downward, there is minimal, if any, downward movement of the resist element. The figure also shows that catenary lines 105 can be used instead of vertical line 107 to limit drift.

FIG. 6 shows another system 110 comprising a float 112 and a resist element 114 that lies within a float passage 116 so the resist element can slide up and down in the float passage. The resist element has considerable mass, (e.g. at least half the buoyancy of the float in the absence of the resist member), and may be made of steel. Strands 120 of SSM material connect the float and resist elements, so the resist element hangs from an upper portion 112U of the float. When the float moves up in the crest of a wave, the momentum of the resist element results in the resist element not moving up as much. As a result, the strands 120 of SSM material are stretched and generate electricity. When the float moves down in the trough of a wave, both the float and resist elements move down, and substantial electricity is not generated. Applicant provides a spring 122 that biases the resist element upward so the SSM strands 120 are only slightly stretched in a quiescent condition (e.g. no waves). The float passage 116 is sealed to provide a closed, dry environment.

The resistance to stretching of SSM material can be controlled. When a float repeatedly moves up and down in waves, the resistance to stretching of the SSM material can be controlled to cause the resist element (or float) to maximize its movement. Although systems are described that use the stretching of SSM material to generate electricity, a variety of other devices are known for generating electricity from the difference in movement of two parts.

Thus, the invention provides systems for generating electricity using a float that lies at the sea surface and floats on the waves, and a resist element that is vertically slidable relative to the float (as where the resist element does not move vertically), with the relative motion of the two parts producing electricity. The resist element usually has a narrow portion that slides vertically in a passage formed in the float. In one system, the float is moored by loose lines that extend to the sea floor, and the resist element has a mass (and/or a water brake) to resist vertical movement and a buoy to make the resist element more neutrally buoyant. In another system, the resist element is moored to the sea floor and the float slides up and down on the resist element.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A wave power generator for use in a sea that has waves, comprising:
   a float that floats at the sea surface and moves up and down in the waves;
   means for limiting horizontal drift of the float from a predetermined quiescent position, while allowing the float to move up and down in the waves;
   a motion resist element that lies under said float, that is of constant primarily neutrally buoyancy to resist vertical movement, and that is coupled to said float to resist horizontal movement of said resist element and float;
   electricity-generating apparatus coupled to said float and to said resist element for generating electricity as the float moves vertically relative to the resist element.

2. The generator described in claim 1 wherein:
   said resist element comprises a mass (70) that tends to move down with a constant force and a biasing device (72) that comprises a buoyant device that tends to move up in the water with a constant force to counter most of the weight of said mass so said mass lies at a constant distance above the sea floor.

3. A wave power generator for use in a sea that has waves, comprising:
   a float (102) that floats at the sea surface and moves up and down in the waves;
   a resist member (104) that lies under said float and is positively buoyant, a vertical line (107) that connects said resist member to the sea floor so the height of the resist member above the sea floor is fixed, said resist member being slideably connected to said float to allow the float to slide up and down relative to said member;
   electricity-generating apparatus coupled to said float and to said resist element for generating electricity as the float moves vertically relative to the resist element.

4. A wave power generator for use in a sea that has waves, comprising:
   a float that floats at the sea surface and moves up and down in the waves;
   means for coupling said float to the sea floor to limit horizontal drift of the float from a predetermined quiescent position, while allowing the float to move up and down in the waves;
   a motion resist element that is coupled to said float to move horizontally with horizontal movement of the float but to allow said resist element to not move vertically with the float;
   electricity-generating apparatus coupled to said float and to said resist element for generating electricity as the float moves relative to the resist element;
   said electricity-generating apparatus comprises SSM (synthetic stretchable material) that generates electricity when stretched;
   said float has a vertical passage (116), and said resist element (114) lies in said passage and hangs by said SSM (120) from said float.

5. A method for generating electricity from sea waves, comprising:

mooring a float to the sea floor through a mooring device that allows the float to move up and down in the waves while limiting horizontal drift of the float away from a predetermined position;

slidably connecting to said float, a motion resist member that resists vertical motion, so when the float moves up and down in the waves the resist member does not move vertically as much as the float;

connecting an electricity generating apparatus to said float and said resist members to generate electricity as the float moves vertically relative to the resist member;

said step of slideably connecting said motion resist member to said float comprises locating said resist member in a vertical passage of said float, and said step of connecting an electricity generating apparatus includes supporting said resist member on SSM (synthetic stretchable material) that, in turn, is supported on said float, so said SSM is stretched when the float moves up in a wave while the resist member does not move up as rapidly as the float.

* * * * *